United States Patent [19]

Haslund

[11] 4,200,819
[45] Apr. 29, 1980

[54] UNITARY SUPERSONIC ELECTRICAL DISCHARGE LASER NOZZLE-CHANNEL

[75] Inventor: Ralph L. Haslund, Mercer Island, Wash.

[73] Assignee: The Boeing Company, Seattle, Wash.

[21] Appl. No.: 835,196

[22] Filed: Sep. 21, 1977

[51] Int. Cl.² ............... H01J 1/88; H01J 61/28; H01S 3/03
[52] U.S. Cl. ............... 313/148; 313/231.6; 331/94.5 G; 331/94.5 PE
[58] Field of Search ............ 313/148, 231.6, 231.4; 331/94.5 PE, 94.5 G

[56] References Cited

U.S. PATENT DOCUMENTS

| | | | |
|---|---|---|---|
| 3,543,179 | 11/1970 | Wilson | 331/94.5 D X |
| 3,882,416 | 5/1975 | Borghi et al. | 331/94.5 G |
| 3,906,392 | 9/1975 | Mann | 331/94.5 G |
| 3,962,656 | 6/1976 | Peressini | 331/94.5 PE |
| 3,995,189 | 11/1976 | Haslund | 313/309 X |
| 4,011,521 | 3/1977 | Kantrowitz et al. | 331/94.5 G |
| 4,042,892 | 8/1977 | Fenneman | 331/94.5 G |

*Primary Examiner*—Palmer C. Demeo
*Attorney, Agent, or Firm*—Cole, Jensen & Puntigam

[57] ABSTRACT

The nozzle and laser channel walls for a supersonic electrical discharge gas laser are formed from fully contoured single pieces of dielectric material. The axially symmetric, two-dimensional wall contours of the combined nozzle and laser channel describe a continuous extension of the subsonic flow plenum, into which the gas is initially introduced, and which is located upstream of the combined nozzle-laser channel. A high precision portion of the contour of the combined nozzle-laser channel extends from a beginning point in the nozzle inlet region near the throat to a termination point which is beyond the nozzle exit plane a distance equal to approximately one-half of the nozzle exit height. The high precision portion is a region of continuous curvature supersonic expansion. Beyond the termination point of the continuous curvature region the walls of the combined nozzle-laser channel are flat and diverge at a constant angle, relative to the flow axis of the laser, to the end of the combined nozzle-laser channel. Flat, flush mounted electrodes are positioned in the flat walled section of the laser channel, forming a discharge region with maximum flow density uniformity and minimum boundary layer thickness. In one embodiment, one electrode is a grid, with bars normal to the direction of flow, and is mounted in a laser channel wall section which is capable of rotation.

13 Claims, 6 Drawing Figures

UNITARY SUPERSONIC ELECTRICAL DISCHARGE LASER NOZZLE-CHANNEL

The Government has rights in this invention pursuant to contract No. F29601-73-A-0038-0001, awarded by The Department of Defense of the United States of America.

BACKGROUND OF THE INVENTION

This invention relates generally to the art of gas lasers, and in particular to a unitary nozzle and laser channel for a supersonic electrical discharge gas laser (EDL).

In a flowing gas electrical discharge laser, a suitably conditioned gas mixture is supplied to a laser channel section where electrical discharge through the gas takes place and the laser beam is optically extracted. Gas conditioning involves control of: (1) the static pressure, which is usually less than atmospheric; (2) the static temperature, which, for example, is of the order of 200° K. for $CO_2$ laser gas mixtures, and of the order of 70° K. for CO laser gas mixtures, (3) the density uniformity, which should be no greater than an order of magnitude smaller than is acceptable in standard wind tunnels; and (4) the flow velocity, which is supersonic both initially and following the discharge-lasing process.

The effect of the discharge lasing-process is to locally increase the gas temperature and pressure so that the gas is no longer usable for lasing. The flow velocity does not change, however, until relaxation waves associated with release of the local overpressure have developed, although the Mach number of the flowing gas decreases in inverse proportion to the square root of the increase in gas temperature. The flow velocity of fully relaxed gas flow is still of the same order of magnitude as the initial undisturbed flow. In operation, the electrical discharge excitation process adds a certain amount of energy per unit mass of gas. The laser power level achievable with a given sized laser channel is thus directly proportional to the gas density and the flow velocity. The use of supersonic flow to obtain expansion cooling and high power operation is more thoroughly discussed in U.S. Pat. No. 3,543,179 issued Nov. 24, 1970 to Jack Wilson, titled: Nitrogen Laser Action With Supersonic Flow, which is incorporated by reference herein.

The local increases in gas temperature and pressure caused by energy addition during the discharge-lasing process are released at sound speed (relative to the moving gas), into adjacent gas in the form of compression waves. Expansion waves are propagated back into the high pressure gas. The variation in gas density through these waves is large and these waves must thus be cleared from the discharge volume before new gas can be used for lasing. For Mach 3 flow, this has been found to require about 1.5 times as long as it takes a core flow gas particle to travel the streamwise length of the discharge volume.

The unique attractiveness of a laser as an electromagnetic wave source and what distinguishes it from other sources of optical beams is that an ideal laser beam is monochromatic and coherent; i.e., it is of one wavelength which is in phase across the wavefront. Because of this, two important effects follow: (1) all points on the wavefront can be brought to the same focus so that the beam intensity is much greater than the source intensity, and (2) the beam is highly directional with the angular spread limited by the diffraction at the exit aperture. The angular spread is, to a first approximation, equal to $2.44\lambda/D$, where $\lambda$ is the wavelength and D is the beam diameter. The laser beam therefore maintains high intensity far from the source, which is optically referred to as the far field.

Different lasers are compared for excellence in terms of the intensity of which they are capable in the far field. It is possible for a small, low power laser to achieve higher laser beam intensities in the far field than a large, high power laser, because the far field intensity of a laser depends on the quality and design of the optical resonator cavity, the electrical-to-optical conversion efficiency and the optical quality, i.e. laser medium homogeneity, of the laser medium. For the most part, each of these three criteria is independent of the others, i.e. for a given laser the cavity optics, the gas discharge-laser excitation physics, and the laser medium optical quality can be separately optimized. However, the specific actual performance of a laser in the far field is dependent upon how well the specific device configuration meets all three criteria.

The optimization of the first two criteria above, i.e. the cavity optics and the gas discharge laser excitation physics have been extensively dealt with elsewhere. See the Wilson patent referenced above, as well as U.S. Pat. No. 3,906,392 to Mann, and U.S. Pat. No. 3,995,189 to Haslund.

The optimization of the third criteria, laser medium homogeneity, is the subject of this application. Laser medium homogeneity is a direct function of the contour of the flow channel, which extends from a point some distance upstream of the supersonic nozzle inlet to the downstream end of the discharge volume, and hence, this application concerns an optimized flow channel configuration.

The degree of laser medium homogeneity required is established quantitatively in terms of the optical path length of the laser wavefront through the gas in the laser cavity. A high performance laser holds the phase shift of the laser wavefront passing through the gas to a valve of a tenth of a wavelength or less. The relationship between optical path length and phase shift can be expressed in terms of flow density uniformity as follows:

$$\frac{\Delta\rho}{\rho} = \frac{1}{(n_s - 1)d} \times \frac{P_s}{P} \times \frac{T}{T_s} \times \frac{\lambda}{10}$$

where $\rho$ is the core flow density whose maximum variation is $\Delta\rho$; $n_s$ is the optical index of refraction at the laser wavelength at standard pressure $P_s$ (1 atm) and temperature $T_s$ (273° K.); P and T are the core flow static pressure and temperature, respectively; and d is the optical path length. For a phase shift of a tenth of a wavelength ($\lambda/10$) in a $20CO_2$-$30N_2$-50He laser gas mixture for which $(n_s - 1)$ is $1.97 \times 10^{-4}$, P=0.75 atm, and T−200° K. at a laser wavelength of $10.6 \times 10^{-6}$ m, a 0.1% gas density uniformity ($\rho p/p$) would permit a maximum total path length of 5.2 m. Such a path length could be made up of 10 passes of 52 cm each. Under the same conditions, a phase shift of hundredth of a wavelength ($\lambda/100$), a maximum path length of 52 cm would be permitted.

It is apparent that (1) the shorter the laser wavelength, (2) the greater the initial gas density (higher static pressure and lower static temperature) and (3) the greater the optical index of refraction, the greater will be the gas density uniformity requirement for a given sized laser. Large supersonic electrical discharge lasers are designed to have optical path lengths of the order of a meter. For a 10CO-20Ar-70He laser gas mixture for which $(n_s-1)$ is $1.5 \times 10^{-4}$, $P = 0.25$ atm and $T = 70°$ K. at a laser wavelength of $5.3 \times 10^{-6}$ m, a 0.1% gas density uniformity over a total path length of 1.0 m would produce a phase shift of $\lambda/47$. A 10CO-80Ar-10He laser gas mixture at the same static conditions (primarily determined by a CO content) has a value of $(n_s-1) = 2.62 \times 10^{-4}$, so that for a density uniformity of 0.1% the same path length of 1.0 m would produce a phase shift of $\lambda/21$. It is therefore clear that for a given size laser channel, and a given gas mixture and minimum allowable phase shift, there is a maximum gas density and, therefore, a maximum power level at which the device can operate. Any decrease in density uniformity will result in a degraded laser medium, leading to beam dispersion and decreased intensity in the far field, which is a direct loss in laser performance. Hence, a high gas density uniformity is a very important laser design objective.

Other losses can also be identified which are flow-dependent. These are associated with the development of a thermal boundary layer. The thermal boundary layer extends from the channel wall to a point in the flow at which the temperature is 0.5% larger than in the core flow. Since the static pressure is constant across the channel, the gas density varies inversely with the local static temperature and hence, the gas density profile across the flow is the inverse of the gas temperature profile. The velocity of the gas flow decreases in the vicinity of the wall. As the boundary layer flow is deaccelerated, there is a recovery of the total, or stagnation, temperature of the gas. A velocity boundary layer is also defined, covering the distance from the wall to a point in the flow where the velocity of the gas is 1% smaller than the core flow velocity. The thermal boundary layer is typically 10%–30% thicker than the velocity boundary layer.

The existence of the low density thermal boundary layer presents two sources of losses in the performance of a supersonic electrical discharge laser. First, the useful discharge cavity height for a given channel height is reduced due to thermal boundary layer growth on the channel walls parallel to the optical path of the wavefront in the discharge cavity, as any discharge energy added to the thermal boundary is wasted. Second, the electrical discharge must be confined well within the bounds of the discharge cavity in the direction of discharge to prevent breakdown (arcing) through the low density gas.

The second constraint also leads to the need for an electrical stand-off distance between the edges of the high voltage discharge electrodes and the nearest grounded conductor. For a metal nozzle, this imposes a streamwise stand-off distance requirement, which necessarily results in an increase in the thermal boundary layer thickness in the vicinity of the electrodes, with resulting large performance losses of the first kind noted above.

The minimum electrical streamwise stand-off distance is roughly equal to the temperature ratio across the nozzle, (i.e., before and after supersonic expansion) multiplied by the electrode separation distance (channel height). The temperature ratio is used as a multiplying factor because the gas at rest at the channel wall surface has a temperature on the order of the initial gas total temperature, and the ratio of wall to core flow gas temperature is equal to the ratio of core flow to wall gas density. For a Mach 3 10CO-20Ar-70He gas laser, for example, the minimum stand-off distance is equal to 3.75 times the electrode gap width.

It is apparent that a thin thermal boundary layer is desirable to minimize device-associated losses. It has also been found that for a given electrode gap width a thin thermal boundary layer permits both higher voltage operation without breakdown and higher current densities at the higher voltages. This leads to higher maximum input power densities and improved laser performance. It has been demonstrated by one embodiment of the subject invention description that a reduction of thermal boundary layer thickness from 25% to 15% of the fixed channel height increased the input power density capability by 36%.

The thickness of the thermal boundary is directly dependent on the length of the nozzle laser channel. Thus, short nozzle laser channels are desirable. To date, however, long nozzle laser channels have been required in order to provide the required electrical isolation between the electrodes and the metal nozzle. A metal nozzle (usually hardened steel) has been used in order to satisfy the very high precision wall contour tolerances. The metal nozzle and laser channel have been made separately with non-optimized contours and flanged together with small steps at the flange interface exceeding the minimum step size, which is 0.0001 inch for Mach 3 flow, for example. Consequently, a steady state wave system with density nonuniformities was propagated into the discharge-cavity region, degrading the laser medium.

Taking the above considerations in combination, it is apparent that conventional electrical discharge gas lasers operate significantly below their inherent capability, due to the use of relatively low flow densities, unsuitable nozzle and laser channel configuration and construction, and relatively thick thermal boundaries in the discharge region.

Accordingly, it is a general object of the present invention to provide a combined nozzle-laser channel for use in a supersonic electrical discharge laser which overcomes one or more of the disadvantages of the prior art stated above.

One object of the invention is to provide such a device wherein the nozzle and the laser channel are unitary.

An additional object of the present invention is to provide such a device which minimizes flow dependent losses in a gas laser.

Another object of the present invention is to provide such a device wherein the density of the gas flow in the laser channel is uniform to the order of 0.1% or better.

A further object of the present invention is to decrease the thickness of the thermal boundary layer in the region of the main discharge electrodes.

Yet another object of the present invention is to increase the power capability of gas lasers.

A still further object of the present invention is to increase the efficiency of gas lasers.

SUMMARY OF THE INVENTION

Accordingly, there is provided a combined nozzle and laser channel structure which is useful in a supersonic electrical discharge laser. It comprises a continuous channel means without transverse joints, having a nozzle portion and a contiguous laser-channel portion. The laser gas mixture enters the combined structure at the inlet of the nozzle portion and flows through the combined structure, exiting at the downstream edge of the laser-channel portion. The continuous channel means is so contoured, streamwise along its length, that (1) the flow of the laser gas mixture becomes supersonic in the nozzle portion, and (2) a discharge cavity is formed in said laser-channel portion when discharge electrodes are properly positioned therein, wherein the contour of the nozzle portion is curved and extends downstream of the exit of the nozzle portion a distance equal to one-half of the nozzle exit height.

DESCRIPTION OF THE PREFERRED EMBODIMENT

Figure 1:
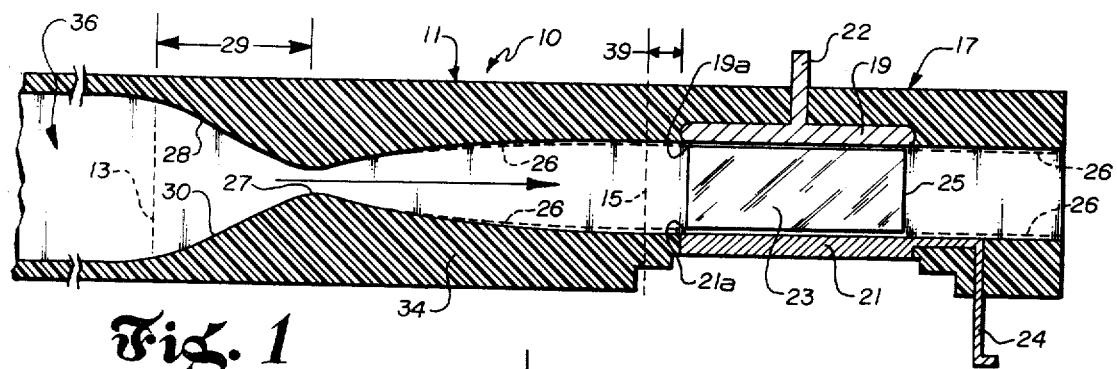
FIG. 1 is a longitudinal cross-sectional view of the combined nozzle and laser channel of the present invention, showing the configuration of the nozzle and laser channel and the location of the discharge cavity region.

Referring to FIG. 1, the present invention, a combined nozzle-laser channel for supersonic electrical discharge gas lasers, is shown generally at 10, and includes (1) a laser nozzle portion 11, which in turn includes a nozzle inlet 13, a nozzle throat 27, and a nozzle exit 15, and (2) a contiguous laser channel portion 17, in which are located a pair of opposing discharge electrodes 19 and 21. Terminal connections 22 and 24 are provided for electrodes 19 and 21, respectively. Defined between discharge electrodes 19 and 21 is a region in the laser channel 17 referred to as a discharge cavity 23, in which the lasing effect is confined.

The electromagnetic wave energy stored in molecular excitation levels from the discharge is then extracted by conventional laser optics 25 to produce the coherent laser beam. The laser optics may be a set of reflective surfaces, located in the side walls of the laser channel or outside of windows in the side walls. Reflective surface 25 is shown in FIG. 1 as part of a set of optics. The optics are so oriented with respect to each other that energy at the laser wavelength is amplified in phase by being reflected between them through the laser gas medium and is taken out through a transparent portion of one partially reflective surface. In FIG. 1, the coherent radiation produced by the laser will exit through reflective surface 25, or the opposing reflective surface, perpendicular from the page, while the gas flows streamwise through the discharge cavity in the plane of the page.

It should be understood that various arrangements of reflective surfaces may be used in gas lasers, including folded path configurations, and that the laser optics themselves form no part of the present invention.

In the present invention, the laser nozzle 11 which produces the supersonic gas flow, and the laser channel 17, in which the lasing effect occurs, are formed by four continuous walls, specifically a top wall 32 and a bottom wall 34, both of which are curved along their interior longitudinal dimension as shown in FIG. 1, and two side walls (not shown) which are flat and connect top and bottom walls 32 and 34.

Each wall is made from a single piece of insulating material, preferably a dielectric material, with no joints. This construction permits the placement of the discharge electrodes 19 and 21 as close as possible to the throat 27 of nozzle 11, which in turn results in a minimum thickness thermal boundary layer in the region of the discharge electrodes 19 and 21. The structural and operational significance of the unitary nozzle and laser channel will be explained in more detail hereinafter.

The combined nozzle-laser channel 10 has a particular configuration which is best understood when explained with the characteristics of the flow of gas from the nozzle inlet to the discharge cavity exit.

Various gaseous compositions have been used successfully to produce the lasing effect. As examples, according to partial pressures, carbon monoxide laser may comprise 10 percent CO, 10 percent Ar and 80 percent He, and a carbon dioxide laser may comprise 15 percent $CO_2$, 35 percent N and 50 percent He. The gas is introduced into a plenum chamber 36 upstream of the nozzle inlet. At this point, the velocity of the gas will be low subsonic at a static temperature very nearly equal to the total temperature, and at a pressure typically of several atmospheres. The gas flows through the plenum chamber 36 towards the nozzle 10. The top and bottom surfaces of plenum chamber 36 are continuous, and converge to mate with the nozzle inlet contour region which begins at entry 13 and extends over the distance labeled 29 in FIG. 1.

The interior surfaces of top and bottom walls 32 and 34 are shown as 28 and 30, respectively, in FIG. 1, while the interior surfaces of the side walls are not shown. Channel width is defined as the distance between the interior surfaces of the side walls, while channel height is defined as the distance between the interior surfaces of the top and bottom walls. When the width of the channel is greater than approximately four times its height, the side walls may be flat without affecting the gas flow in the channel substantially, and hence, in most gas lasers, and in the gas laser shown and described, the channel width is always at least four times greater than the channel height. In the embodiment shown, the ratio of channel width to channel height is significant only in the supersonic portion of the channel, downstream of throat 27, where its smallest value, for high power lasers, is typically greater than seven.

The region of the nozzle channel between inlet 13 and throat 27 is referred to as inlet region 29, over which surfaces 28 and 30 initially converge toward each other at a constant rate of change of about 60° included angle, while the channel width remains constant. In the embodiment shown the distance between surfaces 28 and 30 decreases to a minimum at the throat 27, which minimum distance is fixed under conventional one-dimensional aerodynamic theory by the selection of the gas mixture and the nozzle exit height for a given Mach number.

The length and configuration of inlet region 29 is critical, as it must follow the precise potential flow solution to yield a straight sonic line across the throat 27. The contour of inlet region 29 must also include a viscous flow correction for the boundary layer. The total length of the plenum chamber 36 upstream of the inlet region 29 should be sufficiently long so that boundary layer transition from laminar flow to turbulent flow is made prior to reaching the nozzle inlet 13. If this transition is not made well upstream of the throat 27, a physical correction in nozzle surfaces 28 and 30 following throat 27 must be made in order to prevent the formation of compression and expansion waves in the gas medium when the transition does occur. The transition point can only be predicted probabalistically, and hence not exactly, so that local wall contour corrections having required tolerances are often impossible to make. Once transition from laminar to turbulent boundary layer flow takes place, the thermal boundary growth rate is stable and precisely predictable from that point streamwise of the channel. Failure to achieve transition upstream of the nozzle inlet results in a local error in wall angle which, for a Mach 3 nozzle, is about a factor of 20 larger than can be tolerated to obtain the laser medium density uniformity design goal of 0.1%.

Generally, the nozzle 11 of the present invention is in the class of short continuous curvature nozzles (continuous second order surface derivative), which is one of several conventional nozzle configurations. Hence, from the region of the throat 27 to the nozzle exit 15, surfaces 28 and 30 describe a contour with continuous curvature. A characteristic of the continuous curvature nozzle is its generally high flow quality and low sensitivity to minor gas property variations, such as temperature, pressure, etc.

In a continuous curvature configuration, the throat region of the nozzle is characterized by a relatively small change in curvature. The small change of curvature in throat 27 decreases the difficulty in machining the throat contour to the required tolerance for supersonic gas flow. The machining tolerance is also dependent on the desired density uniformity, and is approximately 0.0001 inch for a density uniformity of 0.1%.

At the throat 27, the flow of the gas will be Mach 1, which is a reference convention indicating that the gas is moving at the local speed of sound. The locus of points in the flow at Mach 1 is a line which is straight across the throat 27, within a tolerance of 0.1%. This is referred to as a straight sonic line.

The gas, which up to throat 27 has been subsonic, becomes supersonic downstream of the throat 27 and increases in velocity over the length of the remainder of the nozzle. It reaches a constant value at the nozzle exit plane. The Mach number of the flow then remains constant over the length of the laser channel, including the discharge cavity 23, prior to discharge.

The selected Mach number of the gas flow in the laser channel is an important consideration in the design of the nozzle and the laser channel, as it determines the tolerance required for the quality of surfaces 28 and 30 and the interior side surfaces to avoid the formation of compression and expansion waves during the supersonic gas flow, which would significantly affect the density uniformity of the flow. As used in this application, surface tolerances and other design criteria will be explained for Mach 3 flow. It should be understood, however, that the surface tolerances will vary depending upon the actual Mach number of the flow.

At the throat 27 of the laser device 10 shown in FIG. 1, the boundary layer of the gas is turbulent. The thickness of the thermal boundary layer 26 is at a minimum just upstream of throat 27, and its dimensions are constant at this point regardless of the configuration of the remainder of the nozzle, or the length of the plenum 36. Hence, there is no configuration contour penalty which is associated with the character of boundary layer transition, as explained above.

Figure 2:
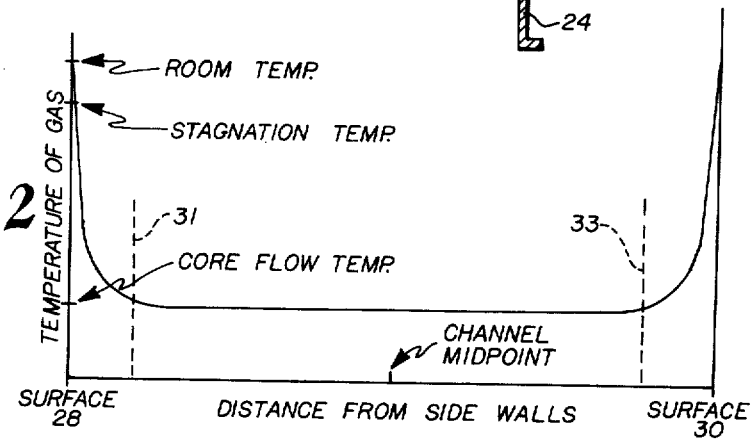
FIG. 2 is a graph showing an example of the temperature of flowing gas in the laser channel as a function of distance from the walls of the laser channel.

The thermal boundary layer portion of the gas flow in the nozzle and laser channel areas is the region which extends from both surfaces 28 and 30 and the side surfaces over which the temperature of the gas decreases to a specified level which is within 0.5% of the core flow temperature. A temperature profile is shown in FIG. 2 for a particular laser, in which the area from surfaces 28 and 30 to imaginary interior boundaries 31 and 33 defines that portion of the gas flow over which the change in temperature occurs and which is referred to as the thermal boundary layer of the gas flow.

The area between interior boundaries 31 and 33 is the area over which the density of the gas is substantially uniform, and is referred to as the core flow area. The density profile of the gas flow is the exact inverse of the temperature profile, as the density uniformity increases to a maximum and remains there between boundaries 31 and 33.

The thermal boundary layer is an important consideration in gas lasers, as the thicker the thermal boundary in the region of the discharge cavity, the smaller the usable cross-sectional area of the gas and hence, the smaller the volume of usable gas in the discharge cavity. A thick thermal boundary layer also adversely affects both the power capability and power efficiency of a given laser. Hence, it is desirable that the dimensions of the thermal boundary layer in the region of the discharge cavity be as small as possible.

The thickness of thermal boundary 26 increases downstream of throat 27 throughout the remainder of the nozzle and the laser channel at a rate which is dependent on the properties of the gas and the Mach number of the gas flow. In general, the thermal boundary layer growth rate is greater the greater the Mach number of the gas flow. For Mach 3 flow, in CO and $CO_2$ gas mixtures under static channel flow conditions, this rate of growth has been found to be approximately 0.8°. Since the average Mach number of the gas flow is less in the nozzle than the laser channel, the rate of growth of the thermal boundary layer 26 is not as great in the nozzle 11 as over an equal length of laser channel.

However, it is still desirable to limit the length of the nozzle as well as the length of the laser channel in order to obtain a minimum thermal boundary layer thickness in the region of the discharge cavity, even though the penalty for nozzle length is not quite as great as for channel length.

In previous supersonic gas lasers, the nozzle has been made out of metal because metal is generally easier to machine to the dimensional tolerances required for high uniformity supersonic flow. However, since the discharge electrodes 19 and 20 are electrically conducting, they must be mounted in insulating material. Frequently, the entire laser channel has been formed of insulating material, thus resulting in a joint where the nozzle and laser channel are joined together. This arrangement has two distinct disadvantages: (1) it is very difficult to properly join the two sections with the required precision, i.e. 0.0001 inch over channel width, and hence, standing waves are created at such a joint; and (2) a rather long laser channel is necessary to provide an adequate electrical standoff distance between the electrodes and the electrically conducting metal nozzle.

The standoff distance, which is the distance between the nozzle exit 15 and the upstream edges 19a, 21a of discharge electrodes 19 and 21, must be equal to or greater than the distance between the discharge electrodes, multiplied by the decrease in the density of the flow across the thermal boundary layer. Particularly in high Mach number flow, wherein the laser gas mixture has a high noble gas content, a very long laser channel is necessary. For Mach 3 flow, for instance, it has been found that the standoff distance for 10% CO-90% noble gas mixtures will be approximately 3.75 times the distance between the discharge electrodes. Long laser channels, of course, result in relatively thick thermal boundary layers at the discharge cavity, because of the constant rate of growth of the boundary layer downstream of the nozzle exit. This decreases laser power capability and efficiency.

In the present invention, however, as briefly explained above, the laser channel and the nozzle are formed from continuous walls of insulating material. Hence, there is no joint between the nozzle and the laser channel, and both the nozzle and laser channel are electrically non-conducting. Such a structure eliminates the need for a standoff distance, and hence, the discharge electrodes can be located as close as possible to the nozzle, thereby minimizing the thickness of the thermal boundary layer in the region of the discharge cavity.

The material used for the nozzle-laser channel walls is a ceramic dielectric. In addition, high purity alumina struts may be used to surround the nozzle for purposes of structural stiffening. Alternatively, the ceramic may be applied to a base of alumina and then machined.

It has been found that the ceramic walls can be machined to the necessary high precision by use of standard machine tools and methods. The use of ceramic for the channel walls is made possible by the discovery that the most important mechanical property of the material is not high strength, but rather a high modulus of elasticity. It is important that the channel walls be able to strictly maintain their structural integrity, i.e. the channel walls should not deflect very much in response to the supersonic gas flow. For Mach 3 flow, for instance, the deflection limit is approximately 0.015° for 0.1% density uniformity. Additionally, it is important that the material have high dielectric strength and virtually no porosity or absorbtivity. A ceramic dielectric meets all of these requirements and is hence an advantageous choice.

As the gas proceeds from the throat 27 of the continuous curvature nozzle, it reaches the nozzle exit 15, which in the embodiment shown in approximately 2.4 times the nozzle exit height from the throat 27, and then enters the laser channel 17. The inviscid nozzle contour is a direct function of, and scales linearly with, the nozzle exit height or the inviscid channel height. The viscous flow boundary layer correction does not, and the displacement thickness correction to the wall contour must be made in order to obtain manufacturing coordinates for each case.

Figure 4:
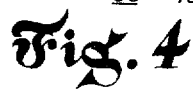
FIG. 4 is a cross-sectional view of the apparatus of FIG. 3, taken along lines 4—4 therein.

In conventional nozzle-channel configurations, the changing curve of the nozzle surfaces, i.e. surfaces 28 and 30 in FIG. 1, stops at the nozzle exit 15. The surfaces of the contiguous laser channel then have a constant rate of change (i.e. no curvature) in order to correct for viscous flow of the gas. For Mach 3 flow for CO and $CO_2$ laser gas mixtures, this correction is 0.3°. This relationship is shown in FIG. 4 which shows a normal channel wall correction relative to an uncorrected wall (the inviscid channel wall).

Figure 6:
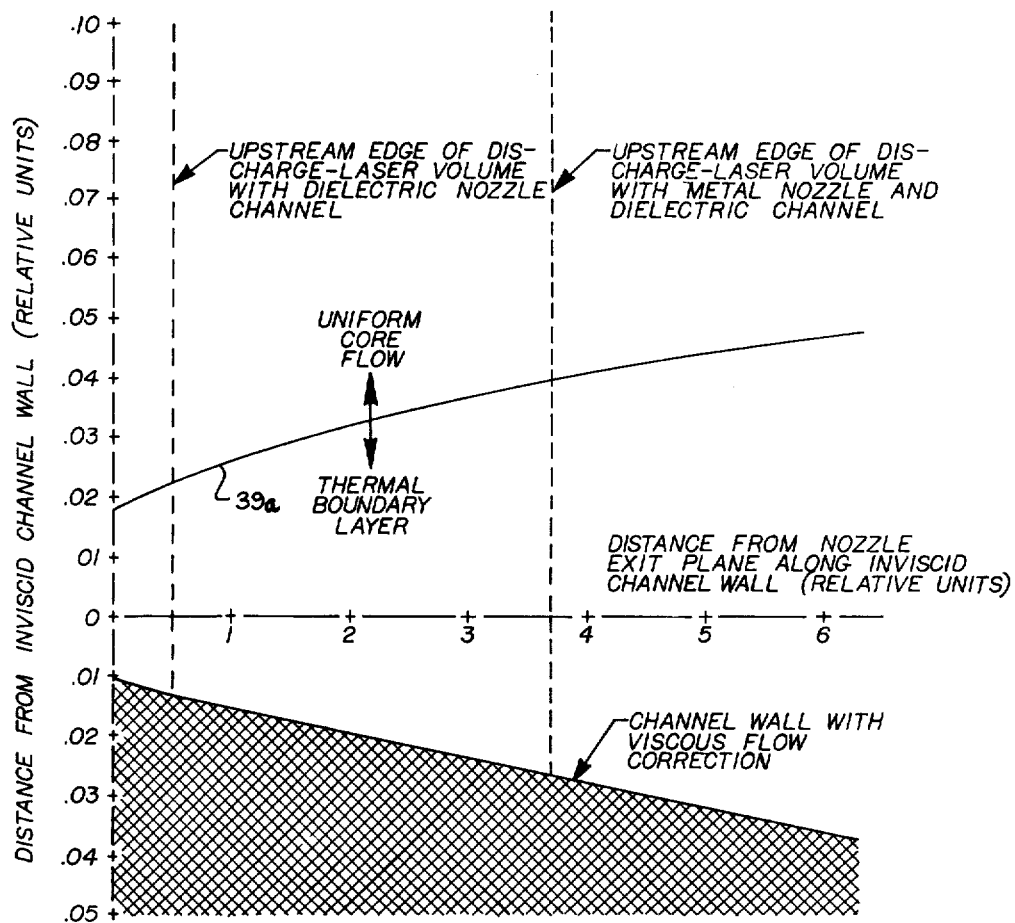
FIG. 6 is a diagram relating the growth in the thermal boundary layer streamwise of the channel relative to the inviscid channel wall and the channel wall corrected for viscous flow.

The transition from continuous curvature to zero curvature at the nozzle exit was chosen on the assumption that the growth of the thermal boundary layer is constant when there are no longer any local streamwise core flow Mach number and static pressure changes. However, this assumption has been found by the inventor to be incorrect. The conventional design results in the creation of expansion waves, with cumulative density variations reaching approximately 2 percent in Mach 3 flow. The actual growth rate of the thermal boundary layer relative to the conventional wall correction beyond the nozzle exit is shown by line 39a in FIG. 6. The 2% density variations resulting from the conventional design is unacceptable in view of the design goal of a maximum of 0.1 percent density variation.

To correct this problem, the inventor has found that the continuous curvature contour of the nozzle should extend downstream of the nozzle exit 15 by a distance equal to approximately ½ the nozzle exit height. This continuous contour correction is shown in the drawings as region 39. This results in a nozzle-laser channel contour which compensates for the viscous flow of the gas without creating expansion waves. This feature is an important aspect of the present invention and significantly contributes towards the achievement of the object of minimal density variation in the core flow of the gas.

At the end of region 39 are the upstream edges 19a, 21a of discharge electrodes 19 and 21. Discharge electrodes 19 and 21 are thus placed as close as possible to the throat 27 of the nozzle to minimize the growth of the thermal boundary layer.

When the gas reaches the discharge cavity, normal operation of the discharge electrodes occurs. In the present invention, an electron beam (not shown) is used to preionize the gas for better electrical discharge. Normal lasing then occurs by means of the main electrical discharge. The resulting excited laser medium energy is then extracted by the conventional laser optics to produce an output beam of coherent radiation.

Discharge electrodes which have been found to be particularly useful in the present invention are the subject of U.S. Pat. No. 3,955,189, issued Nov. 30, 1976 to Haslund entitled "Load Disturbance Transparent Electrode For Supersonic Flow Channel." The electrode disclosed comprises a series of spaced bars directed laterally across the laser channel. The spaced bars defined spaced, closed slots which each have a depth equal to the depth of the bars. The spacing between the slots relative to the depth of the slots is such that the flow creates substantially stationary votexes in the slots. The bottoms of the grooves between the bars are defined by a thin foil that forms a suitable window for the ionizing electron beam. Hence, the electrode is essentially transparent to the ionizing electron beam. A backing grid which is also formed of spaced bars is used to sandwich the foil to prevent undesired movement of the foil without reducing the transparency of the grid arrangement.

It has been found, however, in certain applications, that the foil which is positioned between the grid bars may become somewhat deformed, or further, the wall of the laser channel may deform in the region of the grids, due to atmospheric pressures, resulting in a compression wave which extends upwards from the leading edge of the grid, leading to undesirable density variations in the flow.

Figure 3:
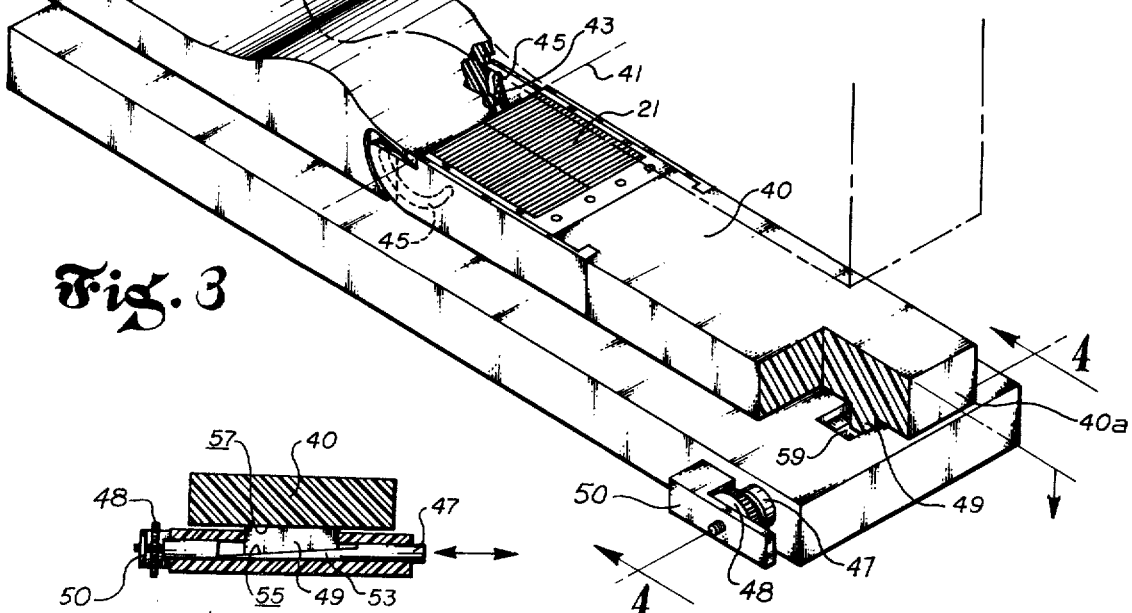
FIG. 3 is a perspective, partially cutaway, view of a portion of the combined nozzle-laser channel, showing the lower wall, including the lower main discharge electrode and the structure for rotating the electrode about its upstream edge.
Figure 5:
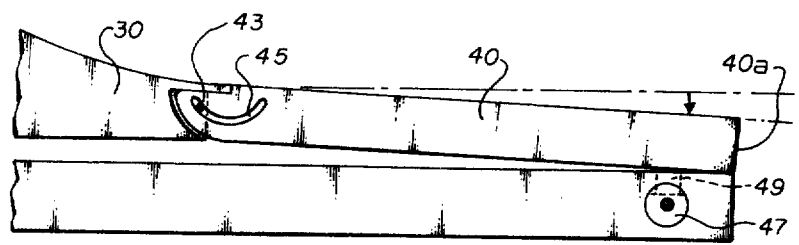
FIG. 5 is a side elevational view of the apparatus of FIG. 3.

Structure for correcting for this compression wave is shown in FIGS. 3–5, in which a portion of the lower wall containing the electrode is rotatable slightly about the upstream or leading edge of the first slot of the electrode. A rotational capability on the order of 1° of rotation has been found to be sufficient to produce an expansion wave having the same point of origin as the compression wave, thereby cancelling the compression wave.

Referring to FIG. 3, a portion 40 of the lower wall 34 of the channel containing the lower electrode 21 is rotatable about line 41 through a key and slot arrangement. Keys 43—43 are positioned in mating quarter-circle slots 45 in the sides of rotatable portion 40 and the adjoining side of lower wall 34.

The mechanism for raising and lowering the rotatable portion 40 about line 41 in precise increments is a screw-driven double-inclined plane device which includes a rod 47 treaded on one end, a knurled trapped drive nut 48, a retainer 50 and a block 49. Rotation of nut 48 results in transverse movement of rod 47, which is fitted in a transverse opening 51 in the lower wall of the laser. About midpoint of rod 47 is a portion 53 which defines an inclined plane. The block 49 has one surface 55 which rests on portion 53 and has a reverse incline so that its upper surface 57 is horizontal. A portion of block 49 extends upwardly through an opening 59 in the lower wall and bears against the bottom of the rotatable portion 40 in the vicinity of the downstream end 40a of rotatable wall portion 40.

Transverse movement of rod 47 by rotation of the trapped drive nut results in an up/down movement of rotatable portion 40. In the embodiment shown, portion 53 of block 47 and surface 55 of block 49 are inclined at approximately 4°. The angle of incline, the angular pitch of the threads on rod 47 and the distance between the mating inclined surfaces and the axis of rotation are all such that a one-quarter turn of nut 48 results in 0.01° angular adjustment of rotatable portion 40. Hence, the present structure permits very accurate rotational adjustments. When the desired rotation is achieved, rod 47 may be locked in position, permitting laser operation.

Thus, a new combined nozzle-laser channel has been disclosed which combines a number of novel structural features, including (1) the continuation of the nozzle contour curve a specified distance beyond the nozzle exit, and (2) the formation of the nozzle and the laser channel from unitary walls of insulating material to produce a device which has minimal thermal boundary losses, and substantially improved efficiency and power capability over prior art devices.

It should be understood that although an exemplary embodiment of the invention has been disclosed for purposes of illustration, various changes, modifications and substitutions may be incorporated in such embodiment without departing from the spirit of the invention, as defined by the claims which follow:

What is claimed is:

1. A combined nozzle and laser channel apparatus for use in a supersonic electrical discharge laser, comprising:

a nozzle portion having an entry plane and an exit plane, and a channel portion contiguous to the nozzle portion, wherein the laser gas mixture enters the nozzle/laser channel at the entry plane of said nozzle portion and flows through the nozzle portion and the laser channel portion, exiting at the downstream edge of said laser channel portion, said exit plane defined as being located at the point along the combined nozzle and laser channel apparatus where the velocity of the flowing gas becomes constant, wherein the contour of said nozzle portion is curved and extends downstream of the exit plane into said laser channel portion a distance equal to one-half of the height of said nozzle portion at the exit plane.

2. An apparatus of claim 1, wherein said nozzle portion and said laser channel portion comprise continuous portions of electrically insulating material having no transverse joints.

3. An apparatus of claim 2, wherein said insulating material is a nonporous, dimensionally stable material.

4. An apparatus of claim 3, wherein said electrically insulating material is a machinable glass ceramic.

5. An apparatus of claim 2, wherein said nozzle/laser channel comprises four continuous walls of said electrically insulating material, including top and bottom walls and two side walls connecting said top and bottom walls, wherein the interior surfaces of the top and bottom walls are curved throughout said nozzle portion and into said laser channel portion a distance equal to one-half the height of said nozzle portion at the exit plane thereof, and then diverge at a predetermined angle thereafter, and wherein the interior surfaces of said side walls are substantially flat.

6. An apparatus of claim 5, wherein said nozzle portion is a continuous curvature nozzle.

7. An apparatus of claim 6, wherein the angle of divergence of the interior surfaces of said top and bottom walls in said laser channel portion is sufficient to compensate for the viscous flow of the laser gas in said laser channel.

8. An apparatus of claim 5, including discharge electrodes located in the top and bottom walls of the apparatus, approximately at the point where the curved contour of said top and bottom walls terminates.

9. An apparatus of claim 8, including means for rotating a portion of one of said top and bottom walls containing one discharge electrode about a line transverse of said laser channel portion and coincident with the upstream edge of said one discharge electrode.

10. An apparatus of claim 9, wherein said rotating means includes means for controlling the rotation of said portion in increments substantially less than 1°.

11. An apparatus of claim 10, including means for locking said portion in position when the desired amount of rotation has been achieved.

12. An apparatus of claim 11, wherein said nozzle portion further includes a throat region, and wherein said top and bottom walls of the nozzle portion have a continuous contour from the entry plane to the throat, and are sufficiently long that the gas flow changes from a laminar to a turbulent flow upstream of said throat.

13. An apparatus of claim 12, wherein the portion of the nozzle between the entry plane and the throat region is defined as the inlet region, and wherein the contour of said top and bottom walls is characterized by an increasing radius of curvature from the point in the inlet region where the flowing gas has a mach number of 0.75 to the throat of the nozzle, where the gas has a mach number of 1, wherein the increasing radius of curvature is so arranged as to result in the gas having a straight sonic line at the throat of the nozzle.

* * * * *